2 Sheets—Sheet 1.
M. J. CUNNINGHAM & J. P. BAILEY.
Hedge-Trimmer.
No. 223,485. Patented Jan. 13, 1880.
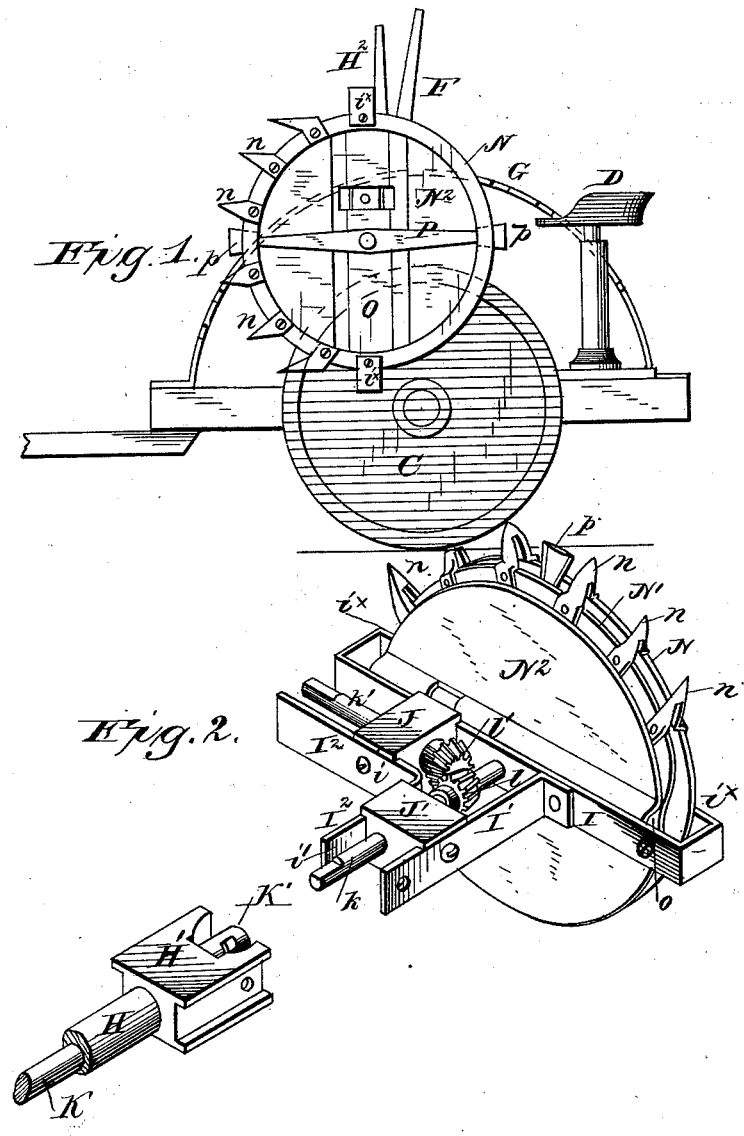

2 Sheets—Sheet 2.

M. J. CUNNINGHAM & J. P. BAILEY.
Hedge-Trimmer.

No. 223,485. Patented Jan. 13, 1880.

WITNESSES
Franck L. Durand
Alex Mahon

INVENTOR
M. J. Cunningham & J. P. Bailey
by A. M. Smith ATTORNEY

UNITED STATES PATENT OFFICE.

MARTIN J. CUNNINGHAM AND JOSIAH P. BAILEY, OF SPRINGFIELD, MO.

HEDGE-TRIMMER.

SPECIFICATION forming part of Letters Patent No. 223,485, dated January 13, 1880.

Application filed November 8, 1879.

*To all whom it may concern:*

Be it known that we, MARTIN J. CUNNINGHAM and JOSIAH P. BAILEY, both of Springfield, county of Greene, State of Missouri, have invented certain new and useful Improvements in Hedge-Trimmers, of which the following is a full, clear, and exact description, reference being had to the accompanying drawings, making part of this specification, in which—

Figure 3:
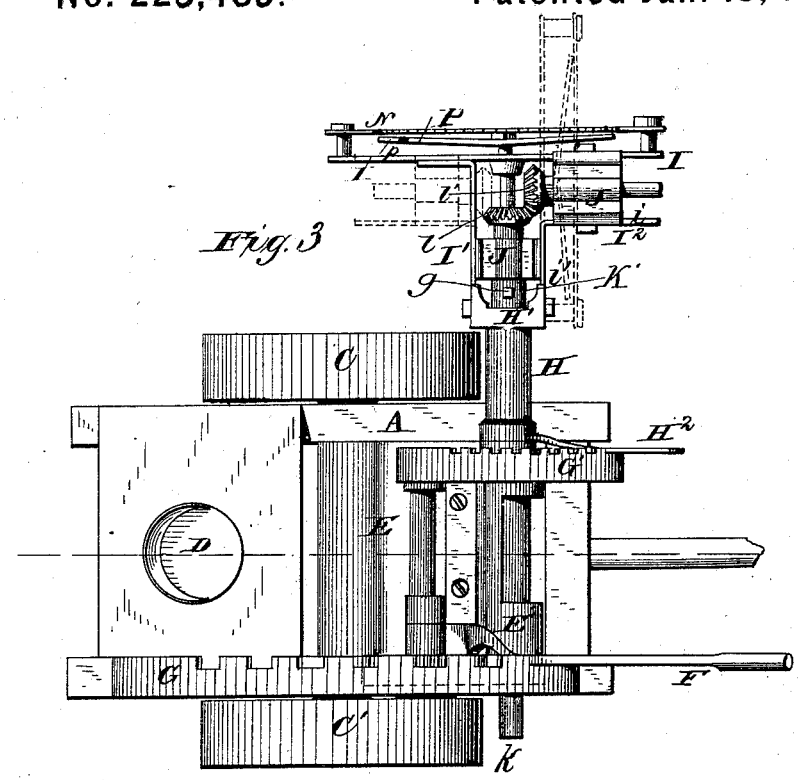
Figure 4:
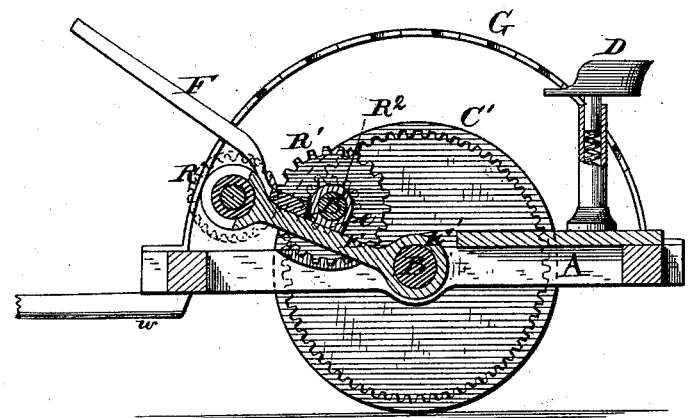

Figure 1 is a side elevation of our improved machine with the cutting apparatus applied in position for giving the vertical cut at the side of the hedge. Fig. 2 is a perspective view of the cutters and cutter-frame detached. Fig. 3 is a plan or top view of the machine, showing a modification in the form of the cutting apparatus; and Fig. 4 is a vertical longitudinal section through the main and gear frames.

Similar letters of reference denote corresponding parts in all the figures.

The invention relates to a novel construction of cutting apparatus adapting it to the specific work it is required to perform, and to the means for effecting the adjustments of the cutting apparatus for adapting it to cut either vertically at the sides or horizontally at the top of the hedge, as hereinafter explained.

In the accompanying drawings, A represents a rectangular main frame; B, the main drive-wheel axle, and C C' the carrying and driving wheels connected therewith, said parts being of any suitable construction. The frame A is provided with a seat, D, for the driver, and has a pole or draft attachment connected with it in any convenient and suitable manner.

E is a gear-frame arranged between the side bars of the main frame, and connected, by a sleeve, E', at its rear lower end, with the main axle B, upon or around which as a center it vibrates, or is made adjustable, for changing the height or angle of the cut, as hereinafter explained.

F is an arm or lever connected by a vertical pivot with the top of gear-frame E, giving it a rigid connection with said frame in the plane of the axis of said pivot, for adapting it to vibrate the frame, but permitting a lateral movement of the lever for throwing it into or out of engagement with a curved rack-bar, G, extending over the axle from end to end of the frame, as shown, and by means of which the lever F, and with it the frame E, can be held at any desired adjustment.

The outer swinging end of frame E has a bearing sleeve or sleeves, $E^2$, in which is mounted a transverse rolling sleeve, H. This sleeve projects at one end beyond the frame A and wheel C, and has a cross-head, H', formed upon or rigidly attached to its outer end, to which the cutter-frame is connected, as will be explained.

The sleeve H has a lever, $H^2$, connected with it, by means of which it can be rocked in its bearings $E^2$, said lever being held at any desired adjustment by engaging with a curved rack, G', attached to and moving with the frame E.

The cutter-frame is composed, in the present instance, of the frame-bar I, a second bar, I', perpendicular thereto, and an angle iron or bar, $I^2$, one portion. $i$, of which is parallel with and is connected to the bar I through an intermediate gear-block, J, and suitable fastening bolts or screws, and the other portion, $i'$, parallel with and connected to the bar I' through a similar gear-block, J', arranged at right angles, or thereabout, to gear-block J. These blocks J J' are perforated longitudinally, or provided with central sleeves arranged in lines parallel with the bars or portions of bar to which they are respectively connected, said sleeves forming bearings for driving-shafts $k$ $k'$, connected by bevel-gears $l$ $l'$. (See Figs. 2 and 3.)

The ends of the main bar I are bent down and back under the bar, either in the form of two right angles, as shown, or in a curved or hook form, as may be preferred, and the recurved ends $i^x$ form a support for an annular bar, N, bolted thereto, and to which the lower ends of the slotted fingers or fixed cutters $n$ are attached. Over the forward half of this annular bar N is arranged a second bar, N', in the form of a half-ring, corresponding to one-half of ring N, and having its rear ends bent up and bolted to the bar I.

The upper arms or legs of the fixed cutters or fingers $n$ are secured to the semicircular bar N, both the upper and lower arms of said fingers being shouldered or provided with offsets, as shown, so as to bring the inner walls of the slots in the fingers flush with the inner adjacent faces of their supporting-bars. By this arrangement of the supports for the slotted fingers or fixed cutters and the manner of attaching the latter thereto, the slots in the latter are left open at the rear for the passage of the cutters and for the escape of obstructing matter, which passes out through the open space O, surrounded by annular bar N.

A circular shield or cover, $N^2$, interposed between the bar I and the ends of bar N', and secured to the former by the same bolts or screws which fasten the bar N' thereto, serves to protect the cutters from the cut material falling thereon.

Above the annular bar N, and between it and bar N', is a rotating bar, P, provided at its outer ends with cutters $p$, which move through the fixed cutters $n$, for cutting the portions of the hedge caught and held thereby. This rotary cutter-bar P is secured to and rotates with the shaft $k$, which may be driven directly from shaft K by being connected therewith, or indirectly through the shaft $k'$, as hereinafter described.

The ends of the bars I I' $I^2$ extend inward beyond the gear-blocks J J', and are perforated for the reception of screws or bolts, by means of which they may be connected with the cross-head H' on the rolling sleeve H as follows: the projecting ends of bars I and $I^2$ for securing the cutters in a horizontal position, and those of the bar I' and the parallel portion of bar $I^2$ for setting the cutters in position to give a vertical cut at the sides of the hedge.

In the first-described attachment — viz., through the ends of bars I $I^2$ — the end of the shaft $k'$ enters a socket-piece, K', on the end of shaft K, and being connected therewith or held by a set-screw, $g$, or equivalent fastening, it receives motion therefrom, and in turn imparts motion through the bevel-wheels $l\ l'$ to the shaft $k$ and cutter-bar P, while, when connected by the bars I' $I^2$, as explained, the end of shaft $k$ enters the socket K', and said shaft receives its movement directly from shaft K.

The shaft K has its bearings in sleeve H, and, extending through said sleeve, is provided at its inner end with a spur-pinion, R, which engages with and receives motion from a spur-gear, R', on a secondary shaft, B', lying parallel with the main shaft or axle B, and mounted in suitable bearings $e$ on the gear-frame E.

The shaft B has a pinion, $R^2$, on one end, which engages with and receives motion from an internally-geared rim on the driving-wheel C'. (See Fig. 4.)

Other forms and a different arrangement of gearing may be employed for driving the cutting-bar P, and either or both of the carrying-wheels may be used for driving said bar, under any suitable arrangement of gearing connecting them therewith.

The form of cutting apparatus described is preferred, because a heavy revolving bar, P, can be employed, and by the application of the cutters $p$ to the ends thereof they are made to assume the form of hatchets or light axes, which serve to chop off the branches of the hedge upheld by the fingers or fixed cutters $n$—an action found to be exceedingly effective in practice. The bar P, when operated directly by shaft $k$, rotates in an opposite direction to that in which it moves when driven by the interposed shaft $k'$, and to accommodate this the axes or knives are made double, adapting them to cut either way, and, by preference, are made to taper inward in such form as to prevent the branches from being thrown or allowed to slip outward when struck by them.

In Fig. 3 a modification is shown in the form of the cutting apparatus, only a single semi-annular bar being employed for the support of the fixed cutters or fingers, the rotating cutters, in this instance, simply moving over the upper faces of the fixed cutters. In this construction the bar N is suspended from the bar I by means of shouldered bolts, in lieu of the recurved ends of bar I, said bolts supporting it in the required relation to said bar. The manner of attaching the cutters to the swinging frame E, by means of which they can be swung up above the wheels or down in front of them, in connection with the rolling sleeve, adapts the cutters to be readily set at any desired height, and also to be adjusted to the required angle or plane when so set, placing them effectually under the control of the attendant.

Having now described our invention, we claim—

1. In a hedge-trimmer, a cutting apparatus made adjustable back and forth above the plane of the main frame, in combination with a gear-frame connected with and vibrating upon the main axle as a center, substantially as described.

2. The gear-frame arranged to vibrate over the main frame, in combination with the rolling sleeve, to which the cutter-frame is attached.

3. The combination of the main frame, the vibrating gear-frame, the rolling sleeve connected therewith, and the cutter-frame, arranged and operating substantially as described.

4. The cutter-frame provided with an arm or arms for connecting it with the main or gear-frame in a vertical position, other than those for connecting it therewith in a horizontal position, in combination with mechanism for actuating the cutters in either position, substantially as described.

5. The cutter-frame composed of the main frame-bar I, bar I', set at right angles thereto, angular bar I², and gear-blocks J J', substantially as and for the purpose set forth.

6. The heavy double-edged cutters applied to the rotating arms or bar, in combination with the fixed cutters or fingers having the semicircular arrangement described, and adapted to sustain the material operated upon against the action of the rotating cutters moving in either direction.

7. The cutter-frame connected with the gear-frame by the rolling sleeve, in combination with the rotating cutters adapted to be operated in either a horizontal or vertical position through the medium of a shaft having its bearings in said sleeve, substantially as described.

M. J. CUNNINGHAM.
J. P. BAILEY.

Witnesses:
A. A. BAILEY,
JAMES KERSHAW.